3,277,041
WATER RESISTANT POLYVINYL ALCOHOL COATINGS

Albert L. Sieg and Merrill W. Killick, Rochester, N.Y., assignors to Eastman Kodak Company, Rochester, N.Y., a corporation of New Jersey
No Drawing. Filed May 15, 1963, Ser. No. 280,747
6 Claims. (Cl. 260—30.4)

This invention relates to compositions comprising polyvinyl alcohol containing 2,3-dihydroxy-1,4-dioxane to enhance its resistance to water.

Polyvinyl alcohol has been considered for many uses but is characterized by susceptibility to water which causes disintegration of layers thereof when processed in aqueous solutions. For instance, polyvinyl alcohol has been suggested as a carrier for silver halide grains in photographic emulsions but unless its water susceptibility is eliminated, processing of those emulsions in aqeous processing solutions presents serious disadvantage. Polyvinyl alcohol also has been suggested for use for surfaces of various kind upon supports, e.g lithographic printing plates. It has also been suggested for use in adhesives, sizes and for various types of coatings.

One object of our invention is to provide polyvinyl alcohol compositions which may be coated out in the form of layers resistant to disintegration by water. Another object of our invention is to provide products in which the base thereof has a polyvinyl alcohol layer thereon which is insoluble in or resistant to water. A further object of our invention is to provide products containing modified polyvinyl alcohol which are useful under aqueous conditions particularly in the photographic art. A still further object of our invention is to prepare products utilizing reaction products of polyvinyl alcohol and dihydroxy dioxane in their preparation. Other objects of our invention will appear herein.

We have found that the value of polyvinyl alcohol is enhanced for many purposes, particularly of a photographic nature if there is incorporated therein a minor amount of 2,3-dihydroxy-1,4-dioxane. We have found that such compositions may be coated out onto various surfaces such as supports, polymeric sheeting, metal articles, fabrics, paper and the like to form layers resistant to the effects of water. We have found that such compositions can be used as the carrier for silver halide in photographic emulsions. We have found that such compositions may be employed for preparing lithographic printing plates particularly if pigments such as titanium dioxide, colloidal silica, clay or their mixtures are incorporated into such compositions which are coated out as a layer onto a suitable support such as paper. We have found that compositions in accordance with our invention in the form of aqueous solutions are useful when coated out onto paper and subjected to drying, forming coatings resistant to solution by water.

We have found that 2,3-dihydroxy-1,4-dioxane when added to aqueous polyvinyl alcohol solutions will combine with the polyvinyl alcohol when coated out in the form of layers or coatings in various proportions, the criterion being that a hardening amount of the dihydroxy dioxane is added to the polyvinyl alcohol. Ordinarily the dihydroxy dioxane will be used in a proportion of 0.5–5% based on the weight of the polyvinyl alcohol but the invention is not limited to proportions within this range.

The following example illustrates the value of compositions in accordance with our invention compared with polyvinyl alcohol compositions having no dihydroxy dioxane therein.

Example

A 10% solution of polyvinyl alcohol in water was prepared and divided into equal parts. Part No. 1 was coated out onto a paper support which was then air dried overnight. To Part No. 2 was added 2,3-dihydroxy-1,4-dioxane in the proportion of 2 grams of the dihydroxy dioxane per 100 grams of polyvinyl alcohol, dry weight. Part No. 2 was coated out onto paper which was air dried overnight. The coating having no dihydroxy dioxane fell away from the support upon the application of a slight pressure when immersed in water at a temperature of 82° F. The coating containing the dihydroxy dioxane prepared in like manner withstood the same light uniform pressure when immersed in water heated up to a temperature of 102° F. This coating after heat treatment by infrared radiation withstood abrasive pressure at temperatures up to 120° F.

The coating containing no dihydroxy dioxane but subjected to the same heat treatment continued to fall away at 82° F. in the same manner as the coating which had not been heat treated.

The compositions in accordance with our invention are especially useful in coating paper surfaces in the preparation of paper having resistance to the effects of moisture. Also they may be coated onto polymeric sheeting of various kinds such as cellulose acetate film base and the like, cellophane sheets or onto textile fibers or fabrics to further the resistance of those materials to abrasion or water. Compositions in accordance with the invention are particularly useful for the preparation of planographic printing plates in which the polyvinyl alcohol is employed as the binder for various pigments which are found to be advantageous in the preparation of those plates. These compositions may also be employed in the photographic industry, for instance, for backing layers or protective coatings for photographic film. Paper may be sized therewith and subsequently calendered to obtain a product resistant to moisture and with a good surface, either with or without the use of filling materials for decreasing the slipperiness of the paper. Textile materials are rendered resistant to moisture when coated with polyvinyl alcohol compositions in accordance with our invention, particularly if the coatings are dried and subjected to a moderate amount of heat.

We claim:

1. Composition comprising polyvinyl alcohol containing sufficient 2,3-dihydroxy-1,4-dioxane to enhance its water resistance properties.

2. A composition containing a water-insoluble inorganic compound and as a carrier therefor polyvinyl alcohol containing sufficient 2,3-dihydroxy-1,4-dioxane to enhance its water resistance properties.

3. A composition comprising colloidal silica and polyvinyl alcohol containing sufficient 2,3-dihydroxy-1,4-dioxane to enhance its water resistance properties.

4. A composition comprising silver halide and polyvinyl alcohol containing sufficient 2,3-dihydroxy-1,4-dioxane to enhance its water resistance properties.

5. A composition containing a mixture of 4 parts of polyvinyl alcohol and approximately 1 part of 2,3-dihydroxy-1,4-dioxane.

6. A support having thereon a coating comprising polyvinyl alcohol and 2,3-dihydroxy-1,4-dioxane.

References Cited by the Examiner

UNITED STATES PATENTS

| | | | |
|---|---|---|---|
| 2,481,676 | 9/1949 | Lowe | 96—111 |
| 2,591,542 | 4/1952 | Harriman | 96—111 X |
| 2,752,246 | 6/1956 | Weaver | 96—114 X |
| 2,870,013 | 1/1959 | Jeffreys | 96—111 X |
| 2,992,130 | 7/1961 | Clarke et al. | 96—111 X |

FOREIGN PATENTS

| | | |
|---|---|---|
| 675,858 | 7/1952 | Great Britain. |

NORMAN G. TORCHIN, *Primary Examiner.*

R. L. STONE, *Assistant Examiner.*